United States Patent [19]

Holzer, Jr.

[11] 3,973,764

[45] Aug. 10, 1976

[54] CLAMPING APPARATUS

[75] Inventor: Carl R. Holzer, Jr., Horseheads, N.Y.

[73] Assignee: Corning Glass Works, Corning, N.Y.

[22] Filed: Aug. 8, 1975

[21] Appl. No.: 602,926

[52] U.S. Cl. .................................. 269/26; 269/46
[51] Int. Cl.² ........................................ B23Q 3/00
[58] Field of Search ......................... 269/26, 25, 46

[56] References Cited
UNITED STATES PATENTS

| | | | |
|---|---|---|---|
| 1,400,801 | 12/1921 | Cohen .................................. | 269/25 |
| 2,354,794 | 8/1944 | Buehler ................................ | 269/25 |
| 2,423,249 | 7/1947 | Minton et al. ....................... | 269/46 |
| 3,145,022 | 8/1964 | Moll .................................... | 269/25 |

*Primary Examiner*—Al Lawrence Smith
*Assistant Examiner*—Robert C. Watson
*Attorney, Agent, or Firm*—Charles W. Gregg; Burton R. Turner; Clarence R. Patty, Jr.

[57] ABSTRACT

Apparatus for clamping a length of a brittle material in preparation for severing thereof into shorter lengths without chipping thereof towards the end of such severing. A pair of bifurcated clamps or clamping members are correspondingly actuated toward each other by a pressurized fluid cylinder and associated piston rod, such cylinder being attached to a clamp support member to which one of the clamps is attached and the otherwise free end of the piston rod being attached to a second clamp support member to which the other of the clamps is attached. A pair of coil springs supports the clamp suppprt members in a vertically floating manner, such clamp support members slidably surrounding guide shafts for vertical alignment of the support members and the attached clamps.

6 Claims, 7 Drawing Figures

CLAMPING APPARATUS

BACKGROUND OF THE INVENTION

There is disclosed, for example, in U.S. Pat. No. 3,853,485, issued Dec. 10, 1974 to Robert G. Hogan and assigned to the same assignee as the present application, a core member for use in a catalytic oxidation converter for internal combustion engine exhaust gases, such core member comprising a cylindrical body of refractory material which has a plurality of relatively minute passages extending therethrough from one planar end or face of the body to the other in a direction generally normal to said faces and linearly parallel with the outer periphery or longitudinal axis of the cylindrical body. In the manufacture of such core members relatively long lengths of refractory material are cut into shorter lengths by a suitable cutting blade such as a saw to provide lengths suitable for the core members. Such refractory materials are brittle and oftentimes, during said cutting of said relatively long lengths of material, intolerable chipping of the edge thereof occurs just prior to or at the finishing of a cut through the long length of material. This may be likened to cutting through a length of wood wherein it is well known that towards the end of such a cut substantial care must be taken in order to attain a clean cut, that is, in order to assure that tearing or chipping of the wood does not occur just prior to or at the finishing of the cut through the wood. Accordingly, the clamping apparatus of the present invention was developed in order to minimize, to the extent possible, the aforementioned chipping of the cut edge of a length of brittle refractory material when such a length is cut into shorter lengths.

Other objects and characteristic features of the invention will become apparent as the description proceeds.

SUMMARY OF THE INVENTION

The invention is believed to be adequately summarized in the foregoing abstract of the disclosure and, therefore, in order to avoid repetition or redundacy to the extent possible, no further summary of the invention is considered necessary nor will any be given.

BRIEF DESCRIPTION OF THE DRAWINGS

In the drawings.

Similar reference characters refer to similar parts in each of the FIGS. of the drawings.

PREFERRED EMBODIMENT OF THE INVENTION

Figure 1:
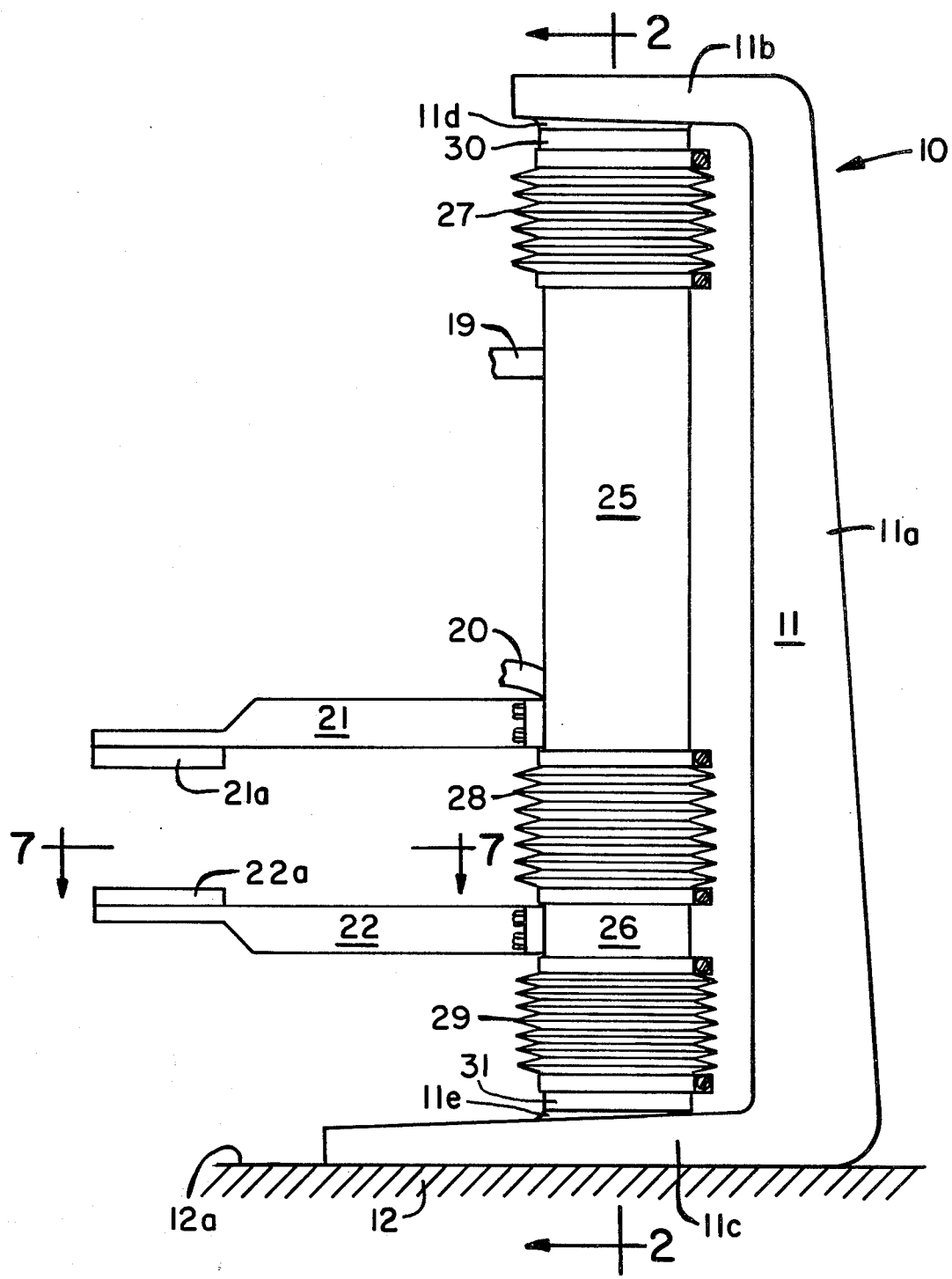
FIG. 1 is a side elevational view of the clamping apparatus embodying the invention.
Figure 2:
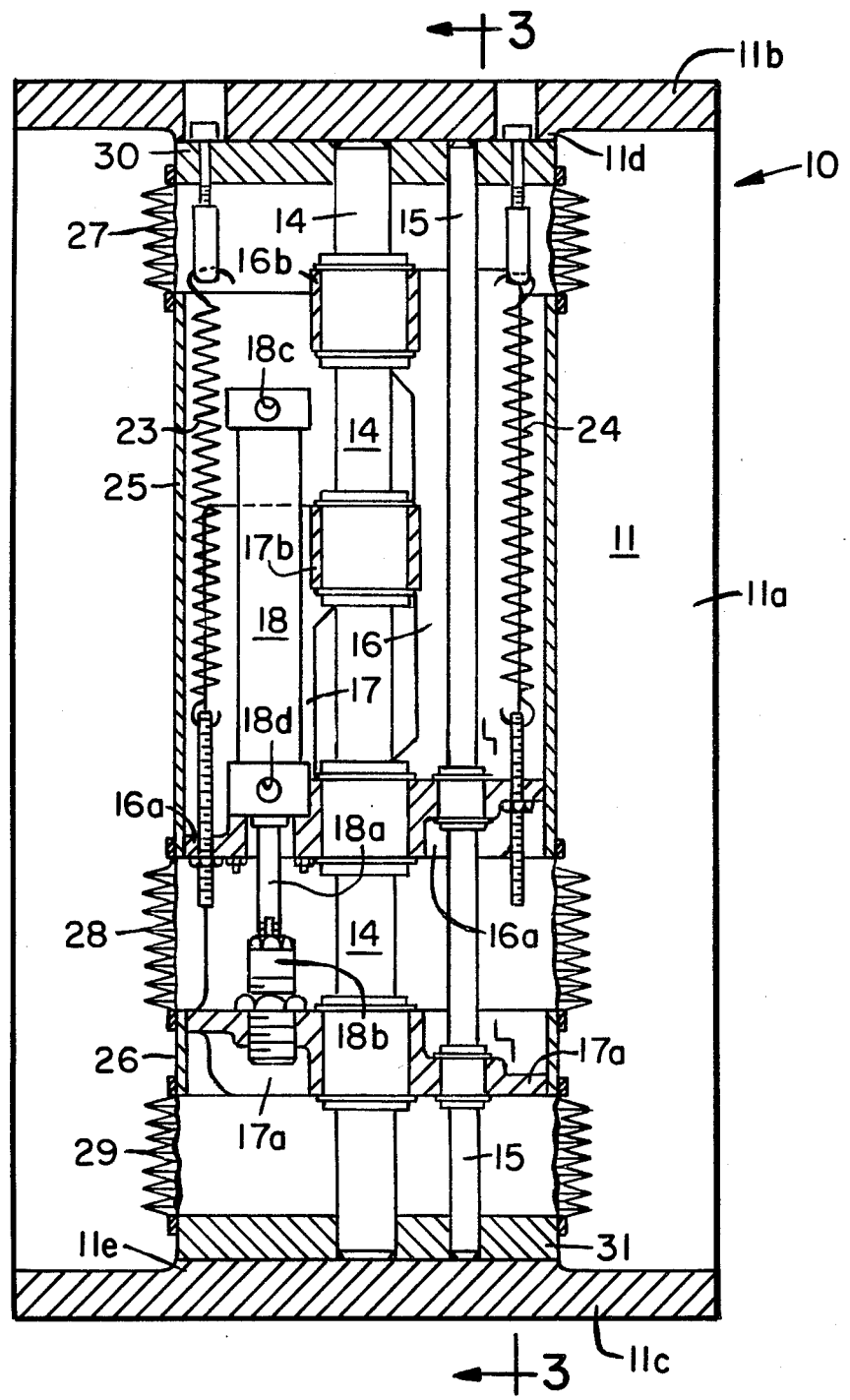
FIG. 2 is a front cross-sectional view, of the apparatus of FIG. 1, such view being taken generally along line 2—2 of FIG. 1.
Figure 3:
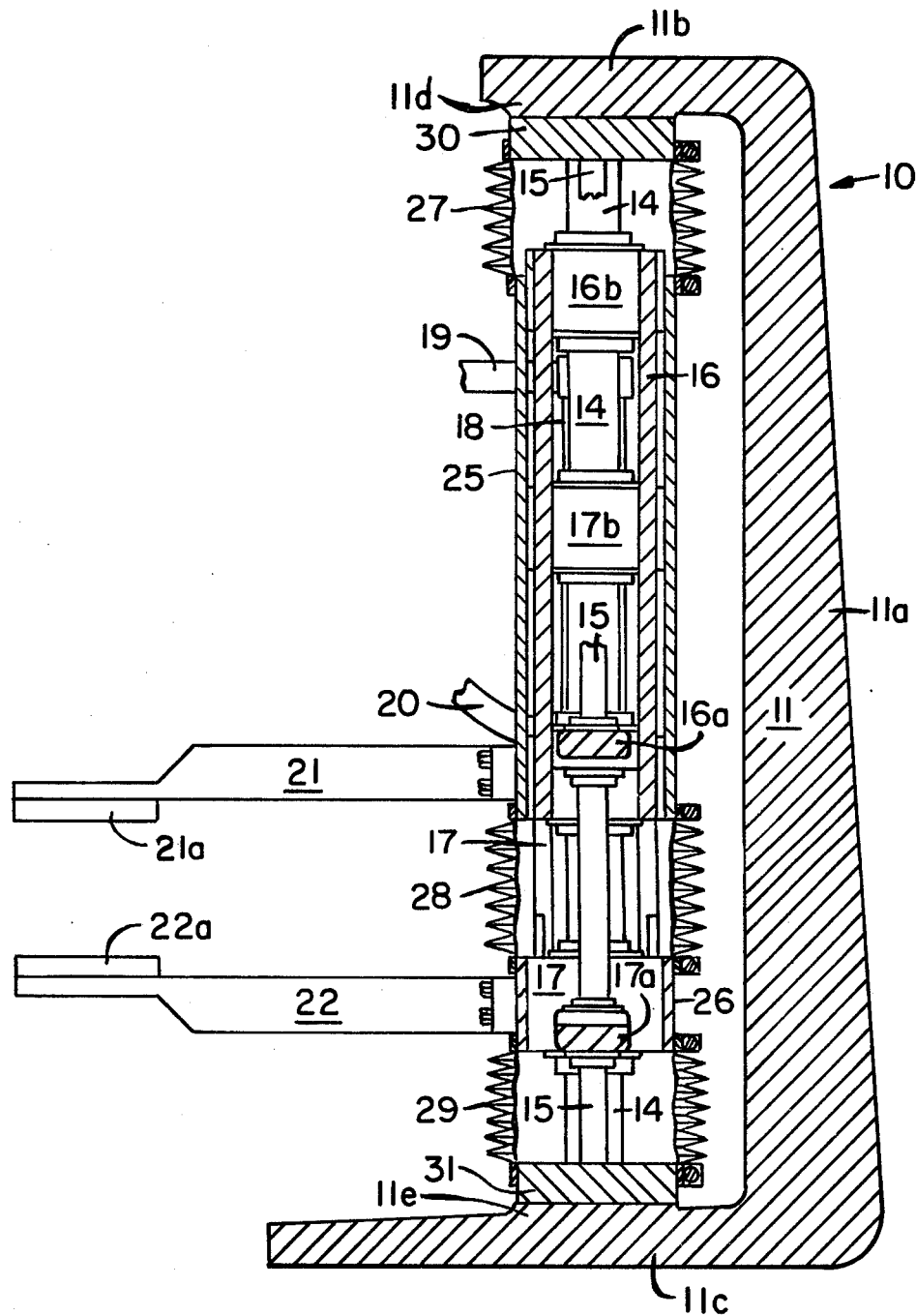
FIG. 3 is a substantially cross-sectional view of the apparatus of FIGS. 1 and 2, such view being taken generally along line 3—3 of FIG. 2.
Figure 4:
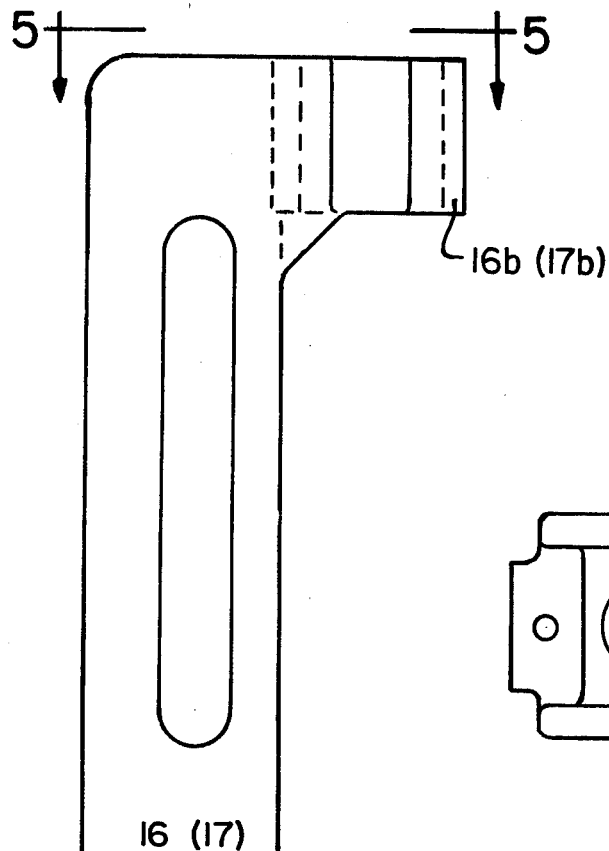
FIG. 4 is a detail view of a part of the apparatus embodying the invention.
Figure 5:
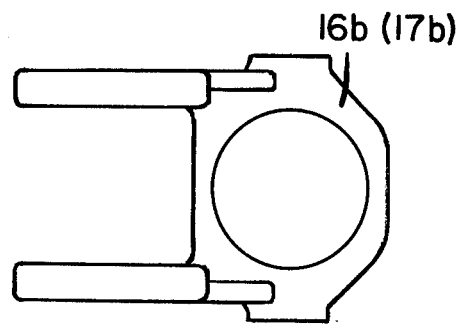
FIGS. 5 and 6 are detail views of the part of the apparatus of FIG. 4, such views being taken generally along lines 5—5 and 6—6, respectively, of FIG. 4.
Figure 6:
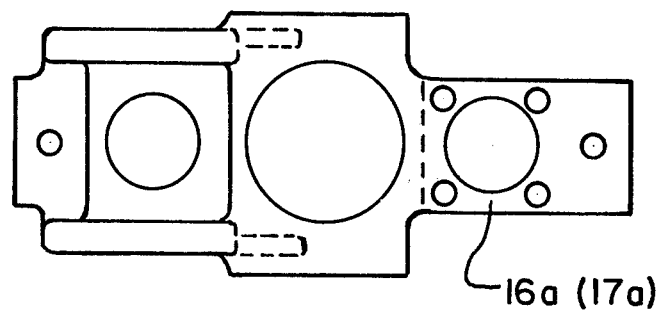

Referring to the drawings in detail, there is shown in FIGS. 1, 2 and 3 a clamping apparatus 10 embodying the invention and comprising a somewhat C-shaped support frame 11 having a vertical main portion 11a and upper and lower arms or portions 11b and 11c extending generally horizontally from said main portion 11a, such lower arm or portion 11c forming a base for support frame 11 and resting on the top or upper surface 12a of a suitable table or platform 12 (FIG. 1). First and second spaced apart guide shafts 14 and 15 (FIGS. 2 and 3) extend vertically between said upper and lower arms 11b and 11c, the upper and lower ends of such shafts extending into suitably fitting holes embodied in upper and lower plates 30 and 31, respectively, attached to bosses 11d and 11e on the lower and upper surfaces of arms 11b and 11c, respectively. Shafts 14 and 15 are also spaced from said main portion 11a of support frame 11 as shown in FIG. 3. A pair of upper and lower substantially C-shaped clamp support members 16 and 17 (see FIGS. 2 through 6) which are similar but are reversed relative to each other (FIG. 2) have generally horizontally extending lower arms 16a and 17a, respectively, each of which embody bushings which snugly but slidably surround said guide shafts 14 and 15. Support arms 16 and 17 also have short generally horizontally extending upper arms 16b and 17b respectively, each of which also embody bushings which snugly but slidably surround said first guide shaft 14. Said lower arm 16a of said upper support member 16 surrounds said guide shafts 14 and 15 in the space between the lower and upper arms 17a and 17b of lower support member 17 while the upper arm 17b of such lower support member surrounds said first guide shaft 14 in the space between lower and upper arms 16a and 16b of upper support member 16.

The lower end of a vertically disposed pressurized fluid actuated motor means such as pressurized fluid cylinder 18 is attached to an upper surface of lower arm 16a of upper support member 16 and the otherwise free end of the associated piston rod 18a of such cylinder extends through a hole in lower arm 16a of support member 16 and is attached to lower arm 17a of lower support member 17 by means of a suitable coupler 18b. First and second pressurized fluid conduits 19 and 20 are connected to orifices 18b and 18c in the upper and lower ends, respectively, of cylinder 18 for selectively supplying pressurized fluid to such ends of such cylinder and, thereby, actuate piston rod 18a out of and into the cylinder, respectively, such actuation of piston rod 18a moving support members 16 and 17 away from and towards each other, respectively, as will be readily apparent from a brief glance at FIG. 2 of the drawings.

Figure 7:
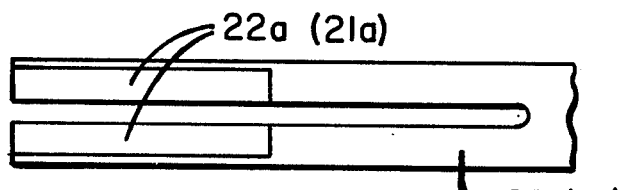
FIG. 7 is a top plan view of a lower one of a pair of similar bifurcated clamps or clamping members employed in the invention, such view being taken generally along line 7—7 of FIG. 1.

First and second, or upper and lower, bifurcated material clamps or clamping members 21 and 22 have first ends attached to lower arms 16a and 17a of support members 16 and 17, respectively, such clamps or clamping members extending horizontally from their respective support members and being in vertical alignment with each other so that the spaces (FIG. 7) between the bifurcations of the respective clamps are vertically aligned. The lower and upper surfaces, respectively, of the bifurcations of clamps or clamping members 21 and 22 preferably have secured thereto, adjacent the second ends thereof and as by a suitable glue or adhesive for example, pads such as 21a and 22a, respectively, of a suitable resilient material such as rubber, for example. The pads such as 21a and 22a are for the purpose of contacting the outer periphery of the length of brittle material which is to be severed or cut into shorter lengths by a suitable severing blade such as a saw blade as previously mentioned. During such a cutting or severing operation, such blade is moved downwardly through the aforesaid spaces between the bifurcations of clamp or clamping members 21 and 22.

The upper ends of longitudinal tensionally resilient means such as coil springs 23 and 24 are connected with upper arm or portion 11b of support frame 11 and the lower ends of such springs are connected with lower arm 16a of upper support member 16, such connections being on opposite sides of guide shafts 14 and 15 as illustrated in FIG. 2. By such arrangement such springs resiliently support upper support member 16 while lower support member 17 is supported by the aforesaid piston rod 18a of cylinder 18 and is, thereby, indirectly also supported by springs 23 and 24.

An upper or large housing or dust cover 25 as of relatively heavy guage sheet metal encloses the upper part of the apparatus, such housing or cover being attached to lower arm 16a of upper support member 16, and being vertically movable therewith. A lower housing or dust cover 26 also of relatively heavy guage sheet metal but of a substantially lesser height than housing or dust cover 25 is attached to lower arm 17a of lower support member 17 and is vertically movable therewith. A bellows or accordion type expandable dust or dirt cover 27 encloses the spaces between the upper end of housing 25 and the upper arm or portion 11b of support frame 11, the upper end of such cover 27 being attached to the aforesaid plate 30 attached to boss 11d on upper arm 11b of support frame 11. Similarly, a bellows or accordion type expandable dust or dirt cover 28 covers the space between and is attached to the lower arms 16a and 17a of support members 16 and 17, respectively, that is, between the lower end of cover or housing 25 and the upper end of cover or housing 26. A third bellows or accordion type expandable dust or dirt cover 29 covers the space between the lower end of cover or housing 26 and lower arm or portion 11c of support frame 11, the lower end of such cover 29 being attached to the aforesaid plate 31 attached to boss 11e on lower arm 11c of support frame 11. Such arrangements of the dust or dirt covers 27, 28 and 29 will be readily apparent from a brief glance at FIGS. 2 and 3 of the drawings taken in conjunction with FIG. 1.

In employing the apparatus of the invention, pressurized fluid is supplied to conduit 19 and thereby to the upper end of cylinder 18 while conduit 19 is connected to atmosphere or a suitable fluid sink, as is well known in the art. Such operation actuates or extends piston rod 18a out of cylinder 18 and clamp support members 16 and 17 and, thereby, arms 16a and 17a of support members 16 and 17 in directions away from each other to correspondingly move clamps or clamping members 21 and 22 and separate such members for receipt therebetween, that is, between resilient pads 21a and 22a, of a length of brittle material which it is desired to cut into shorter lengths as previously mentioned. After positioning said length of material between said pads 21a and 22a, the pressurized fluid supplied to conduit 19 and thence to the upper end of cylinder 18 is terminated and such fluid is then supplied to conduit 20 while conduit 19 is connected to atmosphere or the aforesaid fluid sink. The operation retracts piston rod 18a of cylinder 18 within such cylinder and, thereby, moves arms 16a and 17a of support members 16 and 17 toward each other to correspondingly move clamps or clamping members 21 and 22 and pads 21a and 22a into contact with opposite points or areas on the upper and lower sides of said length of material to clamp such length between said pads with forces commensurate with the pressure of the pressurized fluid employed. It will be noted that clamping members or clamps 21 and 22, that is the pads 21a and 22a thereon, exert equal forces against said upper and lower sides of the length of material due to the arrangement of cylinder 18 and piston rod 18a correspondingly actuating clamps or clamping members 21 and 22 toward each other. Following the clamping of the length of material as discussed above, a suitable severing blade, such as a saw blade as previously mentioned, is moved through the space between the bifurcations of each of the clamps 21 and 22 to sever or cut off a shorter length of said length of material as also previously mentioned. Following such severance or cutting, the pressurized fluid to conduit 20 is terminated and is again supplied to conduit 19 to separate clamps 21 and 22 to unclamp or release the severed lengths of material for removal thereof and then reclamping of the parent length of material in preparation for another desired cut or severance thereof.

Although there is herein shown and described only one form of apparatus embodying the invention, it will be understood that such is not intended to be in any way limiting but that various changes and modifications may be made therein within the purview of the appended claims without departing from the spirit and scope thereof.

What is claimed is:

1. Apparatus for clamping a length of a brittle material for severing thereof into shorter lengths, such apparatus comprising, in combination;
   I. a support frame having a vertical main portion and upper and lower portions extending generally horizontally from such main portion;
   II. first and second spaced apart guide shafts extending vertically between said upper and lower portions of said support frame and connected therewith, such shafts being also spaced from said main portion of such frame;
   III. similar upper and lower substantially C-shaped clamp support members each having a generally horizontally extending lower arm slidably surrounding both of said guide shafts and a shorter generally horizontally extending upper arm slidably surrounding said first shaft, the lower arm of said upper member surrounding said shafts in the space between the upper and lower arms of said lower member and the upper arm of such lower member surrounding said first shaft in the space between the upper and lower arms of said upper member;
   IV. a vertically disposed pressurized fluid cylinder and associated piston rod, such cylinder and the otherwise free end of such piston rod each being attached to a different one of said lower arms of said support members;
   V. longitudinal tensionally resilient means for supporting said upper support member, such means having first and second ends connected to said upper portion of said support frame and to said lower arm of said upper support member, respectively;

VI. first and second bifurcated material clamping members attached to and extending horizontally from said upper and lower clamp support members, respectively, such members being in vertical alignment with each other; and VII. conduit means for selectively supplying pressurized fluid to the upper and lower ends of said cylinder to actuate said clamp support members and, thereby, said clamping members away from and toward each other for receipt and clamping therebetween, respectively, of said length of material, whereby a severing blade moved downwardly between the bifurcations of said clamping members cuts said length of material without chipping thereof towards the finish of the cut.

2. Apparatus in accordance with claim 1 and in which said resilient means comprise coil springs.

3. Apparatus in accordance with claim 1 and in which said first and second clamping means embody pads of a resilient material on their lower and upper material contacting faces.

4. Apparatus in accordance with claim 2 and in which said first and second clamping means embodying pads of a resilient material on their lower and upper material contacting faces.

5. Apparatus for clamping a length of a brittle material for severing thereof into shorter lengths without chipping thereof towards the end of such severing, such apparatus comprising, in combination;

I. a generally C-shaped support frame;

II. a pair of spaced apart guide shafts having their ends connected with the upper and lower arms of said support frame, such shafts also being spaced from the upright portion of said frame;

III. an upper clamp support member having a lower horizontally extending portion slidably surrounding both of said shafts and an upper horizontally extending portion slidably surrounding one of said shafts;

IV. a lower clamp support member having a lower horizontally extending portion slidably surrounding both of said shafts and an upper horizontally extending portion slidably surrounding said one of said shafts in the space between said upper and lower portions of said upper clamp support member;

V. a pair of first and second similar and cooperative bifurcated clamps extending horizontally from said first and second clamp support members, respectively, such clamps being vertically aligned with each other;

VI. a vertically disposed pressurized fluid actuated cylinder and associated piston rod, such cylinder and the otherwise free end of such piston rod each being attached to a different one of said clamp support members;

VII. a pair of tensional coil springs having first ends attached to said upper arm of said support frame and second ends attached to said lower portion of said upper clamp support member; and VIII. first and second conduit means connected to first and second ends of said cylinder, respectively, for selectively supplying pressurized fluid thereto for actuation of said clamps toward and away from each other from clamping said length of material therebetween for severing thereof by a blade moved downwardly through the spaces between the bifurcations of said clamps and thereafter unclamping the severed shorter lengths of such length of material, respectively.

6. Apparatus in accordance with claim 5 and in which the material contacting portion of each said clamp is faced with a pad of a resilient material.

* * * * *